US012801364B2

(12) United States Patent
(10) Patent No.: US 12,801,364 B2
(45) Date of Patent: Nov. 17, 2026

Yan et al.

(54) ENSURING TIME FRAME FOR CLOUD SOFTWARE ROLLOUTS

(71) Applicant: International Business Machines Corporation, Armonk, NY (US)

(72) Inventors: Jiahua Yan, Santa Clara, CA (US); Keshav Mathur, Santa Clara, CA (US); Gopi K. Attaluri, Pleasanton, CA (US); Zamua Nasrawt, Alexandria, VA (US); Marisol Antunez Flores, Seattle, WA (US); Sahil Gandhi, Morgan Hill, CA (US); Mihai Codoban, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 19/056,415

(22) Filed: Feb. 18, 2025

(65) Prior Publication Data

US 2026/0244424 A1 Aug. 20, 2026

(51) Int. Cl.
*G06F 8/61* (2018.01)
*G06F 8/65* (2018.01)

(52) U.S. Cl.
CPC . *G06F 8/61* (2013.01); *G06F 8/65* (2013.01)

(58) Field of Classification Search
USPC .......................................................... 717/172
See application file for complete search history.

(56) References Cited

U.S. PATENT DOCUMENTS

| | | | | |
|---|---|---|---|---|
| 2018/0203684 | A1* | 7/2018 | Shuvali | G06F 8/65 |
| 2020/0019400 | A1* | 1/2020 | Zhao | G06F 11/302 |
| 2021/0081193 | A1* | 3/2021 | Islam | G06F 8/65 |
| 2022/0156054 | A1* | 5/2022 | Thomasma | H04L 67/34 |
| 2023/0409307 | A1* | 12/2023 | Johnston | H04L 67/34 |

OTHER PUBLICATIONS

Rudy Ooms; "Under the Hood of Windows 11 Feature Updates: A Deep Dive into WUfB-DS"; patchmypc.com website [full URL included in ref.]; Jan. 8, 2025 (Year: 2025).*

"Software Updates"; Tesla.com website as captured by the Wayback Machine Internet Archive (archive.org) [full URL contained in ref.]; Feb. 10, 2022 (Year: 2022).*

* cited by examiner

*Primary Examiner* — Yuqing Xiao
*Assistant Examiner* — Clint Thatcher
(74) *Attorney, Agent, or Firm* — Cantor Colburn LLP; Monchai Chuaychoo

(57) ABSTRACT

Cloud software provides services to client devices and other cloud software. During a period of time in which cloud software is being rolled out, such as during an upgrade, the performance of the software may be degraded, or the software may even be offline during the rollout. A rollout window is determined before the rollout is performed. As discussed herein, a process compares a current time with the start and end times of a rollout window. Based on the comparison, a value of a monitor is set to indicate whether rollout is currently permitted. When a request is made to deploy the cloud software, the value of the monitor is checked. The deployment is permitted or blocked accordingly.

20 Claims, 6 Drawing Sheets

300

310

| | RESOURCE ROLLOUT WINDOW | | | | |
|---|---|---|---|---|---|
| 320 | RESOURCE | TYPE | DAY | START TIME | END TIME |
| 330A | PC-123 | PHYSICAL CLUSTER | WEDNESDAY | 0:00 | 1:00 |
| 330B | PC-123 | PHYSICAL CLUSTER | THURSDAY | 1:00 | 2:00 |
| 330C | PC-123 | PHYSICAL CLUSTER | FRIDAY | 2:00 | 3:00 |
| 330D | PC-456 | PHYSICAL CLUSTER | ALL | 4:00 | 5:00 |

340

| | DEFAULT REGIONAL ROLLOUT WINDOW | | | |
|---|---|---|---|---|
| 350 | REGION | DAY | START TIME | END TIME |
| 360A | NORTH AMERICA | ALL | 8:00 | 9:00 |
| 360B | EUROPE | ALL | 22:00 | 23:00 |
| 360C | ASIA | ALL | 14:00 | 15:00 |

370

| | HISTORIC USAGE | | | | | |
|---|---|---|---|---|---|---|
| 380 | RESOURCE | TYPE | BYTES INGRESS | BYTES EGRESS | START TIME | END TIME |
| 390A | PC-123 | PHYSICAL CLUSTER | 87 GB | 60 GB | 2024-10-31 0:00 | 2024-10-31 1:00 |
| 390B | PC-123 | PHYSICAL CLUSTER | 63 GB | 45 GB | 2024-10-31 1:00 | 2024-10-31 2:00 |
| 390C | PC-123 | PHYSICAL CLUSTER | 27 GB | 30 GB | 2024-10-31 2:00 | 2024-10-31 3:00 |
| | ... | | | | | |
| 390D | PC-123 | PHYSICAL CLUSTER | 34 GB | 40 GB | 2024-11-14 23:00 | 2024-11-15 0:00 |

*FIG. 3*

ENSURING TIME FRAME FOR CLOUD SOFTWARE ROLLOUTS

TECHNICAL FIELD

The subject matter disclosed herein generally relates to rollouts of cloud software. Specifically, the present disclosure addresses systems and methods ensuring that rollouts for cloud software are performed during defined time frames.

BACKGROUND

When cloud software is deployed, the deployment may affect the functioning of cloud services and applications that depend on the cloud software.

BRIEF DESCRIPTION OF THE DRAWINGS

Some embodiments are illustrated by way of example and not limitation in the figures of the accompanying drawings.

FIG. 3 is a diagram of a database schema suitable for use in ensuring time frames for cloud software rollouts, according to some example embodiments.

DETAILED DESCRIPTION

Figure 1:
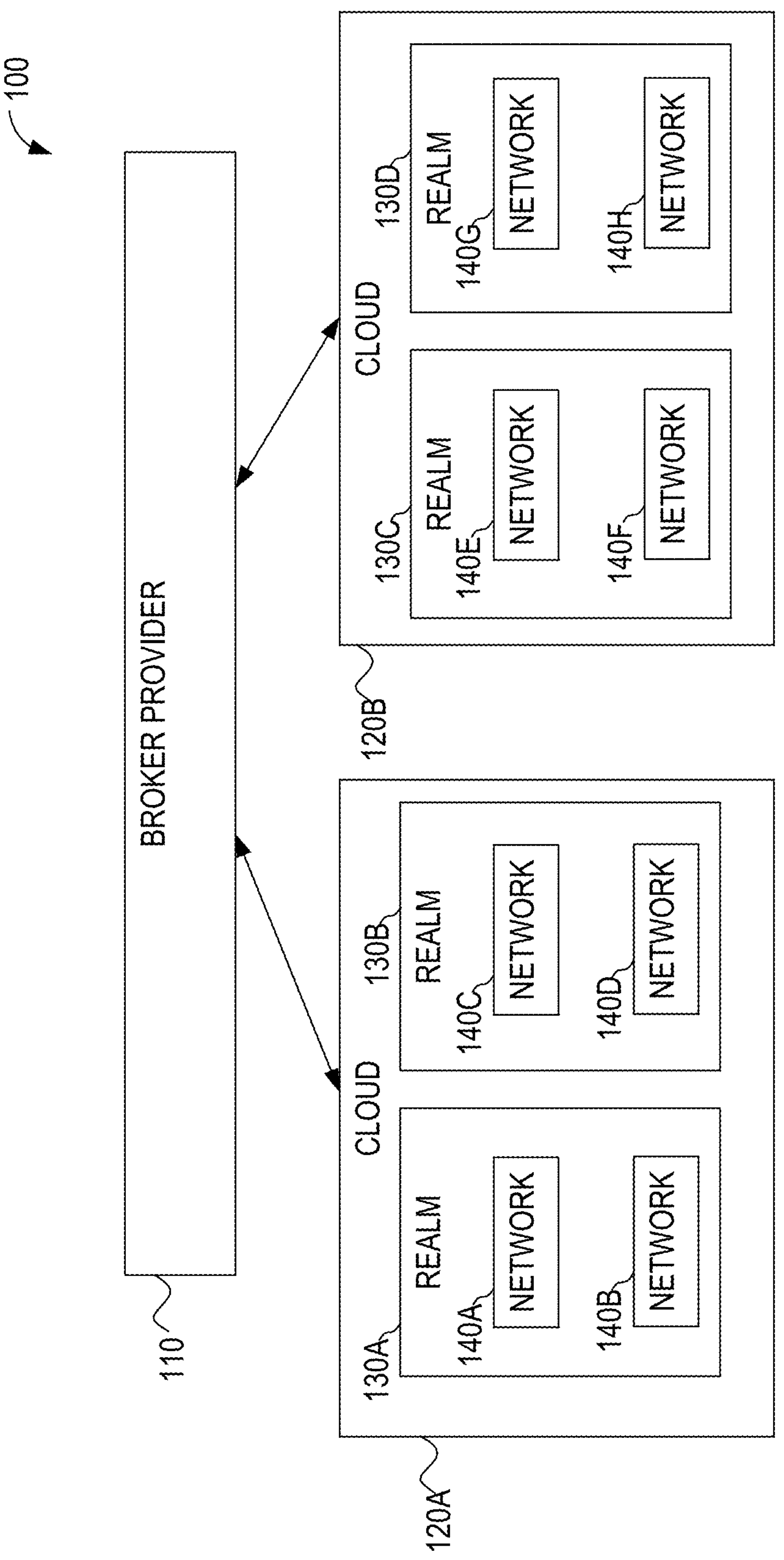
FIG. 1 is a diagram illustrating relationships among a broker provider, cloud service providers, realms, and networks, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

In order to flow data from an on-premises cluster to the cloud, applications or brokers running in the cloud need to establish a connection to the on-premises cluster to be able to fetch the data from the on-premises cluster. The cloud comprises a network of servers that are accessible over the Internet and the software and databases that run on those servers.

When a resource is being deployed to the cloud, there are many possible locations for the deployment. For example, an application is executed by processors and memory in a physical cluster. The physical cluster may handle many tasks, which may be divided into logical clusters. The physical cluster is one of several physical clusters that are managed by a management system such as Kubernetes™, Nomad™, or Elastic Container Service™ (ECS). The management system executes within a network, such as a US network, a European network, or an Asian network of a cloud provider, such as Amazon Web Services™ (AWS), Microsoft Azure™, or Google Cloud Platform™. A customer of the cloud provider may use multiple accounts, referred to as realms, each of which may access one or more networks of the cloud provider.

As used herein, the generic term for a realm, network, management system, physical cluster, logical cluster, or application is "resource." When a resource is created, it is placed under a parent resource. Some resources have a dedicated placement that specifies a particular parent resource. Other resources are shared, and placement of the resource is performed based on information about the resource to be placed and the available parent resources.

Cloud software, such as is Apache Kafka®, provides services to client devices and other cloud software. During a period of time in which cloud software is being rolled out, such as during an upgrade, the performance of the software may be degraded or the software may even be offline during the rollout. Even if the software is available during the deployment, applications that depend on the software may not react gracefully to a restart of the software. In some cases, the rollout process may encounter system failures or dependencies that affect its execution.

A rollout window is determined before the rollout is performed. Additionally, the rollout window may be selected to minimize the disruption. For example, a workload of the cloud software over a previous period of time may be analyzed and used to determine a rollout window. As another example, the rollout window may be selected to be in the middle of the night in the time zone in which the hardware resources used to run the software is located.

As discussed herein, a process compares a current time with start and end times of a rollout window. Based on the comparison, a value of a monitor is set to indicate whether rollout is currently permitted. When a request is made to deploy the cloud software, the value of the monitor is checked. The deployment is permitted or blocked accordingly.

The rollout process uses monitoring systems and database services. If these supporting systems become unavailable, the rollout window validation may not function. In such cases, deployments may be blocked to prevent uncontrolled deployments.

Additionally, certain emergency deployments may bypass the standard rollout window validation through a dedicated scheduler path.

To handle system failures gracefully, the rollout process may include monitoring of both the deployment target and supporting infrastructure components. When a supporting system becomes unavailable, the process may maintain the last known valid state until system availability is restored. For emergency scenarios that require immediate deployment outside of defined windows, the system may provide an override mechanism that can be explicitly invoked with appropriate authorization.

Thus, example embodiments address the technical problem of how to efficiently roll out cloud software. To address the technical problem, example embodiments utilize database monitoring tools. As a result, example embodiments provide a technical solution that, among other things, reduces the operational burden of rolling out cloud software by improving the flexibility and reliability of the system.

FIG. 1 is a diagram 100 illustrating relationships among a broker provider 110; cloud service providers 120A and 120B; realms 130A, 130B, 130C, and 130D; and networks 140A, 140B, 140C, 140D, 140E, 140F, 140G, and 140H, according to some example embodiments. The various elements of FIG. 1 may be referenced by number alone. For example, "a cloud service provider 120" may be used to refer generically to either of the cloud service providers 120A-120B and "the cloud service providers 120" may be used to refer to the cloud service providers 120A-120B collectively. Similarly, "a realm 130" may be used to refer generically to any of the realms 130A-130D and "the realms 130" may be used to refer to the realms 130A-130D collectively. Likewise, "a network 140" may be used to refer generically to any of the networks 140A-140H and "the networks 140" may be used to refer to the networks 140A-140H collectively.

The broker provider 110 provides services using applications running on hardware computing resources of one or more cloud service providers 120. To access the cloud service providers 120, the broker provider 110 may use multiple accounts, each account having different access credentials (e.g., username and password). The realms 130 represent these separate methods of accessing the cloud service providers 120.

The cloud service provider 120 may provide access to multiple networks 140, such as a US network, a European network, and an Asian network. In addition to, or instead of, being divided by geography, networks may be divided by functionality. For example, the network 140A may provide access to artificial intelligence (AI) tools and the network 140B may not. After connecting to a cloud service provider 120 with an account, thus defining a realm 130, applications are deployed to hardware computing resources of a particular network 140.

Figure 2:
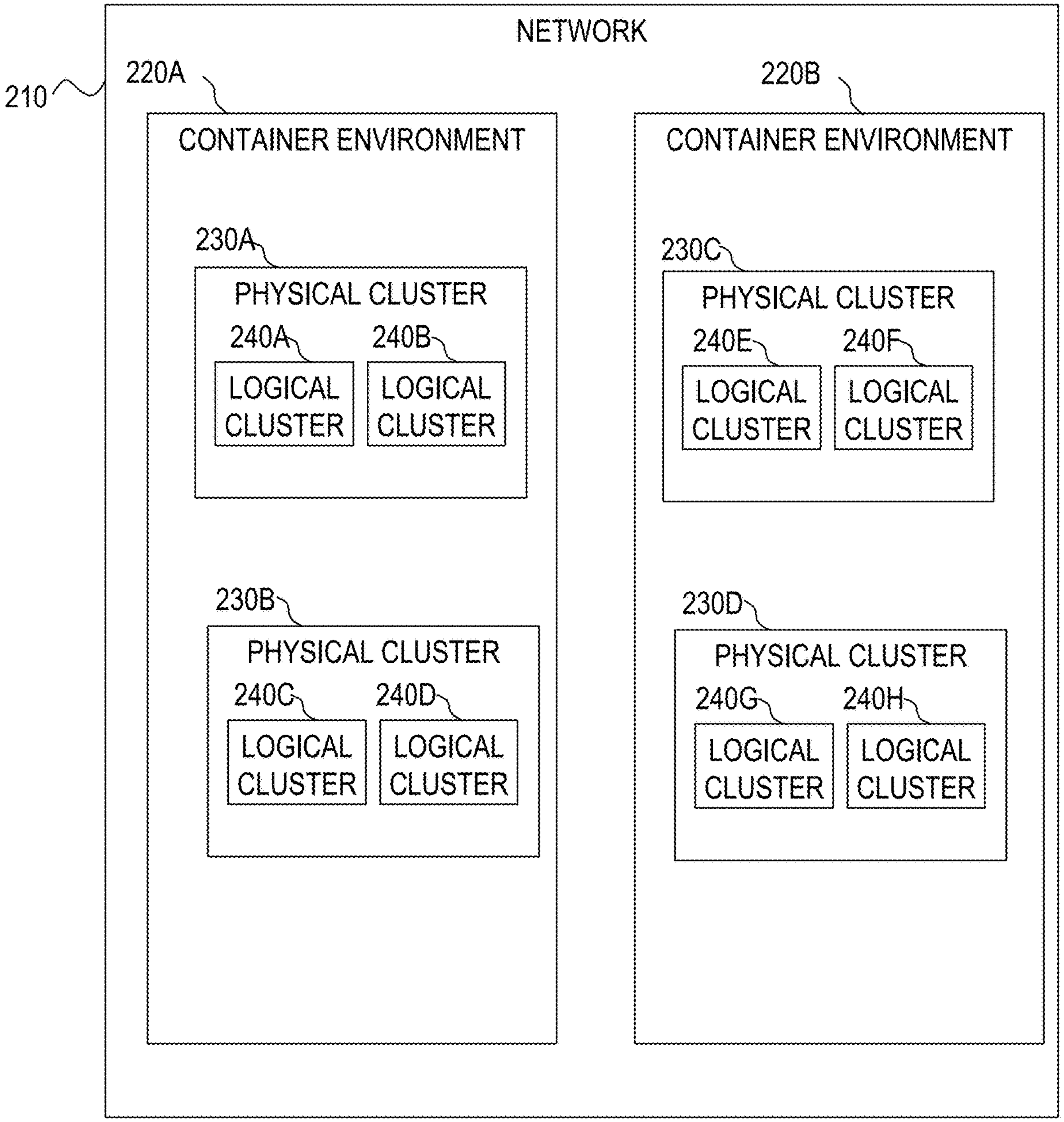
FIG. 2 is a diagram illustrating relationships among a network, container environments, physical clusters, and logical clusters, according to some example embodiments.

FIG. 2 is a diagram illustrating relationships among a network 210; container environments 220A and 220B; physical clusters 230A, 230B, 230C, and 230D; and logical clusters 240A, 240B, 240C, 240D, 240E, 240F, 240G, and 240H, according to some example embodiments. The various elements of FIG. 2 may be referenced by number alone. For example, "a logical cluster 240" may be used to refer generically to any of the logical clusters 240A-240H and "the logical clusters 240" may be used to refer to the logical clusters 240A-240H collectively.

The network 210 may include multiple container environments 220. For example, the container environments 220A may be separate Kubernetes clusters. The container environments 220 may each make use of multiple physical clusters 230. A physical cluster 230 comprises the actual physical computing hardware on which the application will run. The resources of a physical cluster 230 may be divided into multiple logical clusters 240. Thus, even though two containerized applications of the container environment 220A may execute on the same physical cluster 230A, they may execute in different logical clusters 240A, 240B.

As can be seen from FIGS. 1 and 2, the determination of where to deploy an application may be a complex one. The exact cloud service provider 120, realm 130, network 140, container environment 220, physical cluster 230, and logical cluster 240 may be defined by an administrator for each deployed application for static deployments.

However, dynamic deployments make use of algorithmic determinations in order to reduce delay. The complexity of deployment for applications applies equally well to intermediate resources. For example, if a new container environment 220 is to be provisioned, there are many choices as to the particular cloud service provider 120, realm 130, and network 140.

FIG. 3 is a diagram of a database schema 300 suitable for use in ensuring time frames for cloud software rollouts, according to some example embodiments. The database schema 300 includes a resource rollout window 310, a default regional rollout window table 340, and an historic usage table 370.

The resource rollout window table 310 includes rows 330A, 330B, 330C, and 330D of a format 320. By way of example, four rows 330A-330D are shown, but the resource rollout window table 310 may include any number of rows, such as one row for each day (or other period of time) for each resource in the system. For example, a resource rollout window may be stored for each day (or week or month) of each network (or physical cluster, container environment, or logical cluster). Thus, in a system with thousands of clusters, the rollout window table 310 may include tens of thousands of rows, an amount of data far beyond the ability of a human mind to process.

As indicated by the format 320, each of the rows 330A-330D includes an identifier of a resource, a type of the resource, and a time period. The time period includes a start time and an end time, and a day of the week that the start and end time apply to. The day of week may be "all," indicating that the start and end time apply on all days. The start and end times may be stored in a local time of the resource or in a standardized time (e.g., Coordinated Universal Time [UTC]).

Thus, the rows 330A-330C show that the resource rollout window for the physical cluster resource PC-123 is from midnight to 1 AM on Wednesdays, from 1 AM to 2 AM on Thursdays, and from 2 AM to 3 AM on Fridays. The resource rollout window for the physical cluster PC-456 is from 4 AM to 5 AM on all days, as indicated by the row 330D.

The default regional rollout window table 340 includes rows 360A, 360B, and 360C of a format 350. By way of example, three rows 360A-360C are shown, but the default regional rollout window table 340 may include any number of rows, such as one row for each day of the week for each region. A region may be a continent, country, state, county, city, or other geographic area. Thus, dozens, hundreds, or thousands of rows may be used in the default regional rollout window table 340.

Each of the rows 360A-360C includes an identifier of a region and a time period, as indicated by the format 350. As in the resource rollout window table 310, the time period includes a start time and an end time, and a day of the week that the start and end time apply to. The day of week may be "all," indicating that the start and end time apply on all days. The start and end times may be stored in local time of the resource or in a standardized time (e.g., Coordinated Universal Time [UTC]).

In this example, the start and end times are stored in UTC in the default regional rollout window table 340. Thus, the row 360A indicates that the default rollout window for resources in North America is from 8:00-9:00 UTC on all days. The row 360B indicates that the default rollout window for resources in Europe is from 22:00-23:00 UTC on all days. The row 360C indicates that the default rollout window for resources in Asia is from 14:00-15:00 UTC on all days.

The default rollout windows in the default regional rollout window table 340 may be selected to ensure that rollouts do not occur during the prime work hours in the region (e.g., 9 AM-5 PM local time). In some example embodiments, instead of a day of week field, a repeat interval field is used. For example, a repeat interval of one day would indicate that the rollout window applies each day, while a repeat interval of one week would indicate that the rollout window applies at the same time on a particular day of the week.

The historic usage table 370 includes rows 390A, 390B, 390C, and 390D of a format 380. By way of example, four rows 390A-390D are shown, but the historic usage table 370 may include any number of rows, such as one row for each period of time for each resource in the system. For example, resource usage data for each cluster may be stored for each hour of each day of the past three weeks, with data for one hour stored in each row. In this example, the historic usage table 370 would store 24 entries per day times 7 days per week times 3 weeks equals 504 rows per cluster. Thus, in a system with thousands of clusters, the historic usage table 370 may include millions of rows, an amount of data far beyond the ability of a human mind to process.

As indicated by the format 380, each of the rows 390A-390D includes an identifier of a resource, a type of the resource, usage data for the resource (e.g., bytes ingress and egress during a period of time), a start time for the usage data, and an end time for the usage data. In various example embodiments, different or additional usage data may be stored (e.g., maximum CPU and memory usage).

Thus, the row 390A contains historic usage data for the physical cluster PC-123. During the period of time of midnight on Oct. 31, 2024 to 1:00 on Oct. 31, 2024, the bytes ingress of the physical cluster PC-123 was 87 GB. During the same period of time, the bytes egress was 60 GB.

The row 390B contains historic usage data for the same resource during the following one hour period of time. During this period of time, the bytes ingress was 63 GB and the bytes egress was 45 GB.

Historic usage data for the next period of time is stored in the row 390C. During this period of time, the bytes ingress was 27 GB and the bytes egress was 30 GB. Some rows are omitted after the row 390C. During the last hour of Nov. 14, 2024, the bytes ingress was 34 GB and the bytes egress was 40 GB.

The broker provider 110 may populate the resource rollout window table 310 based on data in the default regional rollout window table 340, the historic usage table 370, or any suitable combination thereof. For example, the broker provider 110 may determine the rollout window for one or more hardware resources based on a region of the hardware resource by accessing the default regional rollout window table 340 and store the rollout window in the resource rollout window table 310 of the database.

As another example, the broker provider 110 may determine the rollout window for one or more hardware resources based on historic usage data of the hardware resource by accessing the historic usage table 370. A rollout window for which the hardware resource has the lowest historic usage may be selected as the rollout window for the hardware resource. The broker provider 110 stores the rollout window in the resource rollout window table 310 of the database.

As still another option, a user may select the rollout window for deployment of their software resources. A user interface may be presented that includes the rollout window determined by the broker provider 110 and allows the user to override the determined rollout window. The user-selected rollout window is stored in the resource rollout window table 310.

Figure 4:
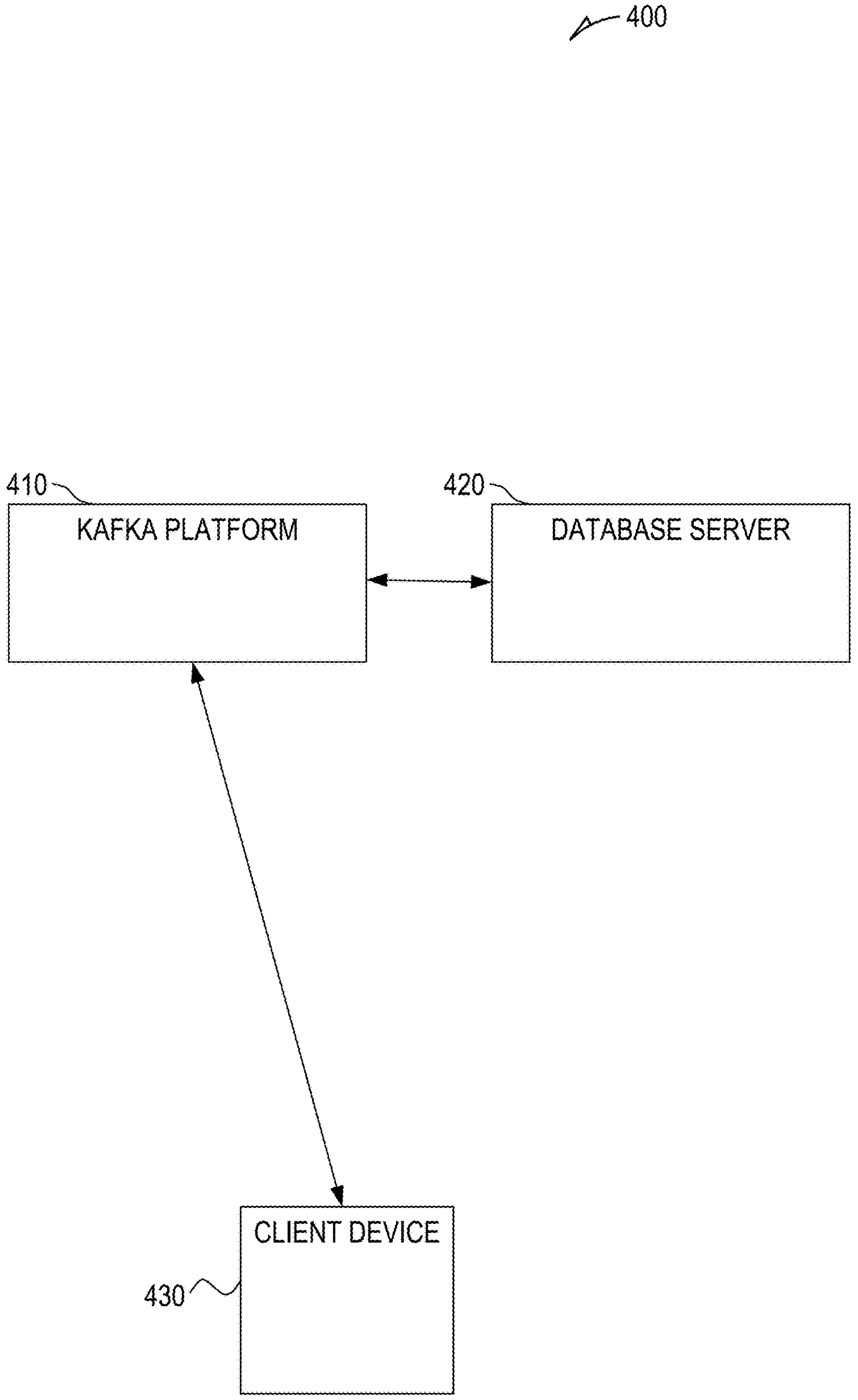
FIG. 4 is a diagram illustrating relationships among a Kafka™ platform, a database server, and a client device, according to some example embodiments.

FIG. 4 is a diagram 400 illustrating relationships among a Kafka™ platform 410, a database server 420, and a client device 430, according to some example embodiments. The Kafka™ platform 410, the database server 420, and the client device 430 may be connected by a network. The Kafka™ platform 410 is shown by way of example. In other example embodiments, other real-time data streaming platforms may be used.

The database server 420 may store data for rollout windows using the database schema 300 of FIG. 3. The Kafka™ platform 410 may be an implementation of, or part of, the broker provider 110 of FIG. 1. A request to roll out cloud software to a hardware resource may be received by the Kafka™ platform 410 from the client device 430. The Kafka™ platform 410 determines whether or not to proceed with the rollout based on the data stored in the database server 420.

Figure 5:
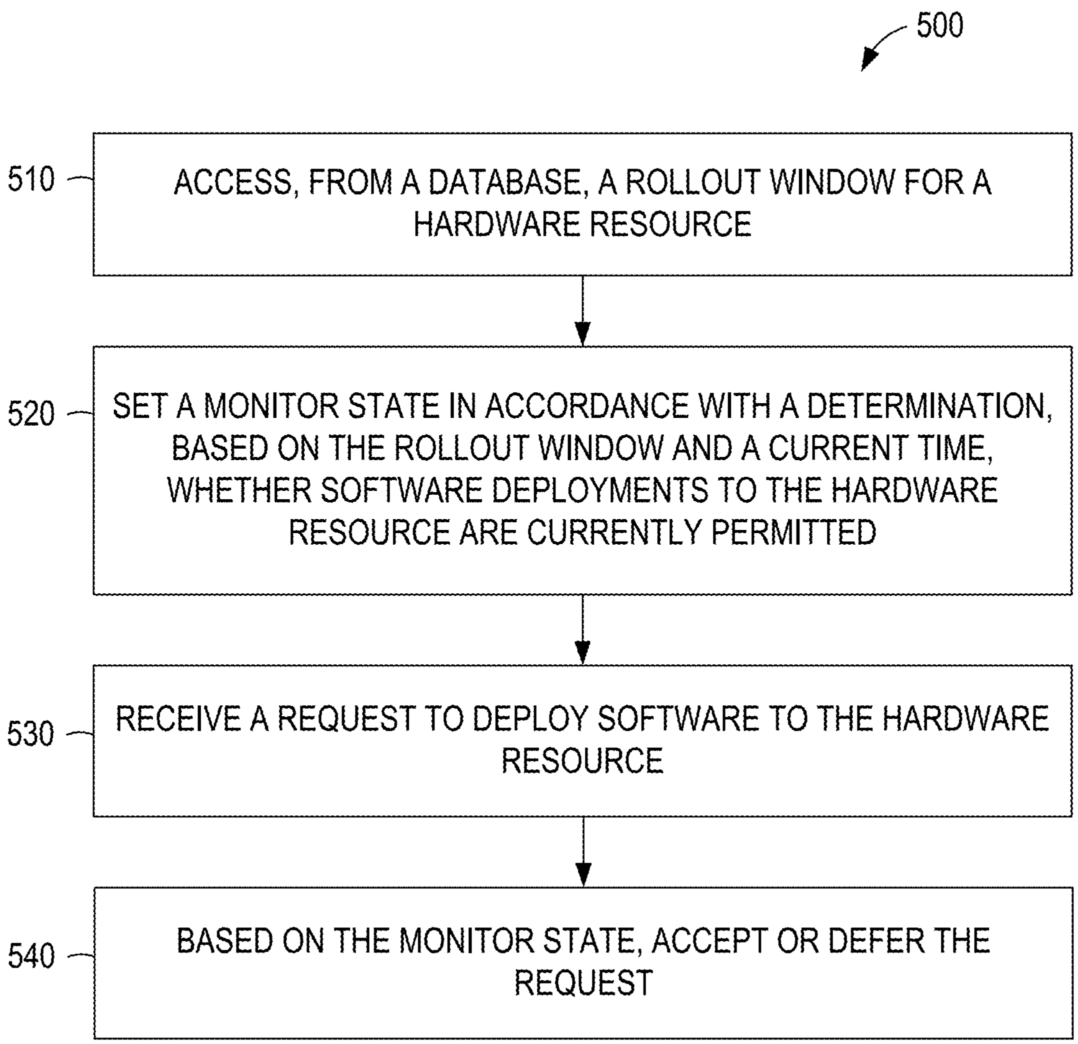
FIG. 5 is a flowchart illustrating operations of a method for ensuring time frames for cloud software rollouts, according to some example embodiments.

FIG. 5 is a flowchart illustrating operations of a method 500 for ensuring time frames for cloud software rollouts, according to some example embodiments. The method 500 includes operations 510, 520, 530, and 540. By way of example and not limitation, the method 500 is described as being performed by the broker provider 110 of FIG. 1, in communication with the cloud service providers 120A-120B, realms 130A-130D, networks 140A-140H, container environments 220A-220B, physical clusters 230A-230D, and logical clusters 240A-240H, of FIGS. 1-2. Prior to performing the method 500, resource rollout window data may be stored in a database, such as the database schema 300 of FIG. 3.

In operation 510, the broker provider 110 accesses, from a database, a rollout window for a hardware resource. For example, the resource rollout window table 310 may be queried to determine a rollout window that applies to the current day. Thus, on a Wednesday, the accessed rollout window for the physical cluster PC-123 is midnight to 1 AM.

The broker provider 110 sets a monitor state in accordance with a determination, based on the rollout window and a current time, whether software deployments to the hardware resource are currently permitted (operation 520). For example, if the current time is 4:30 AM on a Wednesday, the broker provider 110 determines that the current time is outside of the rollout window. Accordingly, the broker provider 110 sets a monitor state that indicates that software deployments to the physical cluster PC-123 are not currently permitted.

Operation 510 may be performed by accessing the database server 420 of FIG. 4 each time that the value of the monitor is to be set. Alternatively, operation 510 may be performed at less-frequent intervals than operation 520. For example, the rollout window that applies to the current day may be read once per day and cached in the Kafka™ platform 410. In the same example embodiment, the value of the monitor may be set once per minute. Thus, in this example, operation 520 would be performed sixty times for each performance of operation 510. In some embodiments, an administrator may send a command to force operation 510 to be performed, to ensure that the rollout window data is updated by the Kafka™ platform 410.

Operations 510 and 520 may be repeated for multiple hardware resources. Thus, at the same time (e.g., 4:30 on a Wednesday), the broker provider 110 may access, in operation 510, a rollout window for the physical cluster PC-456 of 4 AM to 5 AM. In operation 520 for the physical cluster PC-456, the broker provider 110 sets another monitor state that indicates that software deployments to the physical cluster PC-456 are currently permitted. Operations 510 and 520 may be performed at a predetermined interval (e.g., every minute, every five minutes, or every fifteen minutes), so that the state of the monitor is kept up to date.

The monitor may include a timestamp, an identifier of the hardware resource, and a binary value that indicates whether rollouts are permitted to the identified hardware resource. The timestamp indicates the time at which the monitor was updated.

In operation 530, the broker provider 110 receives a request to deploy software to the hardware resource. For example, an administrator may submit the request from a client device to perform a deployment process to multiple resources. The broker provider 110, in this example, receives, via a user interface, a bulk request to deploy the software to the multiple hardware resources. Thus, operation 530 may be repeated for each hardware resource to which the software is being deployed. The request to deploy the software may be, for example, a request to upgrade a version of the software, a request to restart the software, or another deployment request. The order of the individual deployment requests may be based on a risk score (e.g., high, medium, or low) of each hardware resource among the multiple hardware resources.

The broker provider 110, in operation 540, accepts or defers the request based on the monitor state. Continuing with the examples above, a request to deploy the software to the physical cluster PC-123 would be deferred and a request to deploy the software to the physical cluster PC-456 would be accepted. When the request is accepted, the method 500 may further include the deployment of the software to the hardware resource. When the request is deferred, the software is not deployed until a later time. A notification may be provided to an administrator of the status of the software deployment. In some example embodiments, requests that are not accepted are rejected and will not be deployed absent a further deployment request. Whether unaccepted requests are deferred or rejected, by use of the method 500, software deployments are only performed within the predetermined rollout windows.

Figure 6:
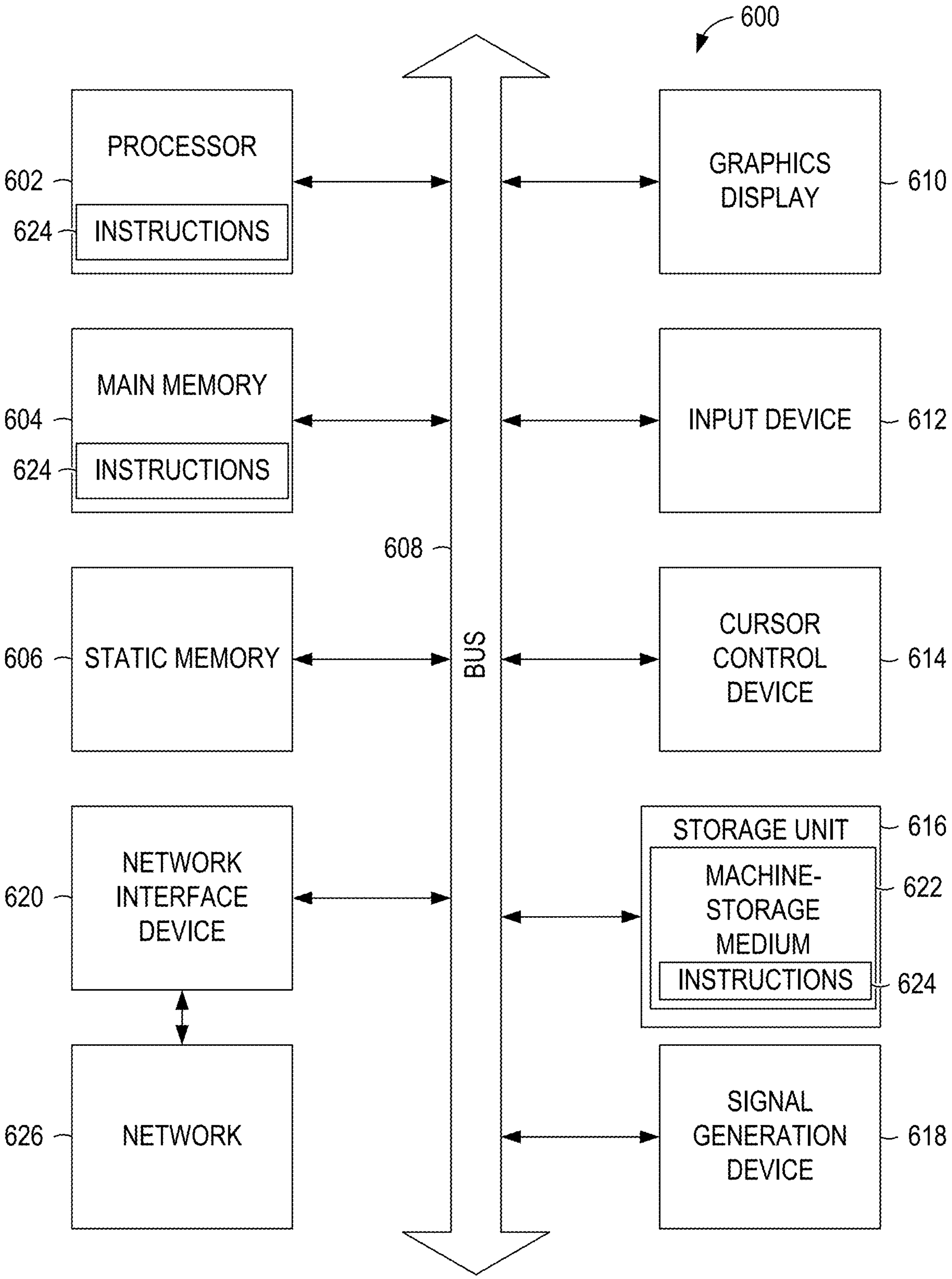
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the method 500 of FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a communication network 626 via the network interface device 620.

In some example embodiments, the machine 600 may be a portable computing device and have one or more additional input components (e.g., sensors or gauges).

Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 604, 606, and/or memory of the processor(s) 602) and/or storage unit 616 may store one or more sets of instructions 624 and data structures (e.g., software) embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage medium 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The machine-storage medium 622 specifically excludes carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communication network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface [API]).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

In view of the disclosure above, various examples are set forth below. It should be noted that one or more features of an example, taken in isolation or combination, should be considered within the disclosure of this application.

EXAMPLES

Example 1 is a system comprising: one or more hardware processors; and a memory that stores instructions that, when executed by the one or more hardware processors, cause the one or more hardware processors to perform operations comprising: accessing, from a database, a rollout window for a hardware resource; based on the rollout window and a current time, setting a monitor state in accordance with a determination whether software deployments to the hardware resource are currently permitted; receiving a request to deploy software to the hardware resource; and based on the monitor state, accepting or deferring the request.

In Example 2, the subject matter of Example 1, wherein the accepting of the request comprises deploying the software to the hardware resource.

In Example 3, the subject matter of Examples 1-2, wherein the accessing of the rollout window and the setting of the monitor state are repeated at a predetermined interval.

In Example 4, the subject matter of Example 3, wherein the predetermined interval is one minute.

In Example 5, the subject matter of Examples 1-4, wherein the request to deploy software comprises a request to upgrade a version of the software or a request to restart the software.

In Example 6, the subject matter of Examples 1-5, wherein the operations further comprise: determining, based on historic usage data of the hardware resource, the rollout window for the hardware resource; and storing the rollout window in the database.

In Example 7, the subject matter of Examples 1-6, wherein the operations further comprise: determining, based on a region of the hardware resource, the rollout window for the hardware resource; and storing the rollout window in the database.

In Example 8, the subject matter of Examples 1-7, wherein the rollout window comprises a start time, an end time, and a day of week.

In Example 9, the subject matter of Examples 1-8, wherein the operations further comprise: receiving, via a user interface, a first request to deploy the software resource to a plurality of hardware resources comprising the hardware resource; and selecting the hardware resource from the plurality of hardware resources based on a priority of the hardware resource.

Example 10 is a method comprising: accessing, by one or more hardware processors and from a database, a rollout window for a hardware resource; based on the rollout window and a current time, setting a monitor state in accordance with a determination whether software deployments to the hardware resource are currently permitted; receiving a request to deploy software to the hardware resource; and based on the monitor state, accepting or deferring the request.

In Example 11, the subject matter of Example 10, wherein the accepting of the request comprises deploying the software to the hardware resource.

In Example 12, the subject matter of Examples 10-11, wherein the accessing of the rollout window and the setting of the monitor state are repeated at a predetermined interval.

In Example 13, the subject matter of Example 12, wherein the predetermined interval is one minute.

In Example 14, the subject matter of Examples 10-13, wherein the request to deploy software comprises a request to upgrade a version of the software or a request to restart the software.

In Example 15, the subject matter of Examples 10-14 includes determining, based on historic usage data of the hardware resource, the rollout window for the hardware resource; and storing the rollout window in the database.

In Example 16, the subject matter of Examples 10-15 includes determining, based on a region of the hardware resource, the rollout window for the hardware resource; and storing the rollout window in the database.

In Example 17, the subject matter of Examples 10-16, wherein the rollout window comprises a start time, an end time, and a day of week.

Example 18 is a machine-storage medium comprising instructions that, when executed by one or more hardware processors of a machine, cause the machine to perform operations comprising: accessing, from a database, a rollout window for a hardware resource; based on the rollout window and a current time, setting a monitor state in accordance with a determination whether software deployments to the hardware resource are currently permitted; receiving a request to deploy software to the hardware resource; and based on the monitor state, accepting or deferring the request.

In Example 19, the subject matter of Example 18, wherein the accepting of the request comprises deploying the software to the hardware resource.

In Example 20, the subject matter of Examples 18-19, wherein the accessing of the rollout window and the setting of the monitor state are repeated at a predetermined interval.

Example 21 is an apparatus comprising means to implement any of Examples 1-20.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:

one or more hardware processors; and a memory that stores instructions that, when executed by the one or more hardware processors, cause the one or more hardware processors to perform operations comprising:

accessing, from a database, a rollout window for a hardware resource;

based on the rollout window and a current time, setting a monitor state in accordance with a determination whether software deployments to the hardware resource are currently permitted, the monitor state comprising a timestamp that indicates a time at which the monitor state was updated, an identifier of the hardware resource, and a binary value that indicates whether rollouts are permitted to the hardware resource;

receiving a request to deploy software to the hardware resource; and based on the monitor state, accepting or deferring the request, the accepting of the request comprising deploying the software to the hardware resource, wherein the request is a bulk request to deploy the software to multiple hardware resources including the hardware resource, and wherein an order of individual deployment requests of the bulk request is based on a risk score of each hardware resource among the hardware resources.

2. The system of claim 1, wherein the accessing of the rollout window is repeatedly performed at a first predetermined interval and wherein the setting of the monitor state is repeatedly performed at a second predetermined interval shorter than the first predetermined interval such that the setting of the monitor state is performed multiple times during the first predetermined interval.

3. The system of claim 2, wherein the first predetermined interval is one day and the second predetermined interval is one minute.

4. The system of claim 1, wherein the request to deploy software comprises a request to upgrade a version of the software or a request to restart the software.

5. The system of claim 1, wherein the operations further comprise:

determining, based on historic usage data of the hardware resource, the rollout window for the hardware resource; and storing the rollout window in the database.

6. The system of claim 1, wherein the operations further comprise:

determining, based on a region of the hardware resource, the rollout window for the hardware resource; and storing the rollout window in the database.

7. The system of claim 1, wherein the rollout window comprises a start time, an end time, and a day of week.

8. The system of claim 1, wherein the operations further comprise:

receiving, via a user interface, a first request to deploy the software to a plurality of hardware resources comprising the hardware resource; and selecting the hardware resource from the plurality of hardware resources based on a priority of the hardware resource.

9. A method comprising:

accessing, by one or more hardware processors and from a database, a rollout window for a hardware resource;

based on the rollout window and a current time, setting a monitor state in accordance with a determination whether software deployments to the hardware resource are currently permitted, the monitor state comprising a timestamp that indicates a time at which the monitor state was updated, an identifier of the hardware resource, and a binary value that indicates whether rollouts are permitted to the hardware resource;

receiving a request to deploy software to the hardware resource; and based on the monitor state, accepting or deferring the request, wherein the accepting of the request comprises deploying the software to the hardware resource, wherein the request is a bulk request to deploy the software to multiple hardware resources including the hardware resource, and wherein an order of individual deployment requests of the bulk request is based on a risk score of each hardware resource among the hardware resources.

10. The method of claim 9, wherein the accessing of the rollout window is repeatedly performed at a first predetermined interval and wherein the setting of the monitor state is repeatedly performed at a second predetermined interval shorter than the first predetermined interval such that the setting of the monitor state is performed multiple times during the first predetermined interval.

11. The method of claim 10, wherein the first predetermined interval is one day and the second predetermined interval is one minute.

12. The method of claim 9, wherein the request to deploy software comprises a request to upgrade a version of the software or a request to restart the software.

13. The method of claim 9, further comprising:

determining, based on historic usage data of the hardware resource, the rollout window for the hardware resource; and storing the rollout window in the database.

14. The method of claim 9, further comprising:

determining, based on a region of the hardware resource, the rollout window for the hardware resource; and storing the rollout window in the database.

15. The method of claim 9, wherein the rollout window comprises a start time, an end time, and a day of week.

16. A machine-storage medium comprising instructions that, when executed by one or more hardware processors of a machine, cause the machine to perform operations comprising:

accessing, from a database, a rollout window for a hardware resource;

based on the rollout window and a current time, setting a monitor state in accordance with a determination whether software deployments to the hardware resource are currently permitted, the monitor state comprising a timestamp that indicates a time at which the monitor state was updated, an identifier of the hardware resource, and a binary value that indicates whether rollouts are permitted to the hardware resource;

receiving a request to deploy software to the hardware resource; and based on the monitor state, accepting or deferring the request, wherein the accepting of the request comprises deploying the software to the hardware resource, wherein the request is a bulk request to deploy the software to multiple hardware resources including the hardware resource, and wherein an order of individual deployment requests of the bulk request is based on a risk score of each hardware resource among the hardware resources.

17. The machine-storage medium of claim 16, wherein the accessing of the rollout window is repeatedly performed at a first predetermined interval and wherein the setting of the monitor state is repeatedly performed at a second predetermined interval shorter than the first predetermined interval such that the setting of the monitor state is performed multiple times during the first predetermined interval.

18. The machine-storage medium of claim 17, wherein the first predetermined interval is one day and the second predetermined interval is one minute.

19. The machine-storage medium of claim 16, wherein the request to deploy software comprises a request to upgrade a version of the software or a request to restart the software.

20. The machine-storage medium of claim 16, wherein the operations further comprise:

determining, based on historic usage data of the hardware source, the rollout window for the hardware resource; and storing the rollout window of the database.

* * * * *